INVENTOR
Albert Russell VanCortlandt Warrington
BY
Misegades and Douglas
ATTORNEYS

United States Patent Office 3,515,943
Patented June 2, 1970

3,515,943
ELECTRICAL FAULT DETECTOR
Albert R. van Cortlandt Warrington, Bexhill, Sussex, England, assignor to The English Electric Company Limited, London, England, a British company
Filed Sept. 29, 1967, Ser. No. 671,824
Claims priority, application Great Britain, Sept. 29, 1966, 43,495/66
Int. Cl. H02h 3/28
U.S. Cl. 317—27                                   1 Claim

ABSTRACT OF THE DISCLOSURE

This invention utilises the phenomenon that under certain fault conditions the waveform of the supply signal is distorted. For example, a sinusoidal voltage source causes a sinusoidal current to flow along a normal good conductive path but, should this current pass through a non-linear resistance, e.g. an arc (sparking) path, faulty insulation, dry soil in the earth, etc. or even the human body (since this exhibits a non-linear resistance), then harmonics appear in the waveform and the sinusoidal characteristic is distorted.

Thus, by determining the ratio or percentage of harmonic to fundamental components in the waveform an indication is made of the presence of a fault, and this is effected in this invention by the provision of two filters for passing the fundamental and harmonic components, respectively, deriving D.C. signals proportional to each and effecting a protective function in dependence on the relative amplitudes of the two signals.

---

This invention relates to an electrical fault detector, and more particularly relates to a circuit for detecting such faults as produce a distorted waveform by determining the ratio of the harmonic of fundamental components in this waveform.

From one aspect, the present invention consists in a circuit for detecting such electrical faults as distort the waveform of the supply, comprising filter means connected to receive the electrical supply signal and adapted to transmit to a first input of a comparator only the fundamental component of said signal and to transmit to a second input of the comparator only the harmonic components of said signal, the comparator being operable to develop an output having a value dependent on the relative magnitudes of the components applied to its first and second inputs, and a control device for effecting a control function in response to the value of said output attaining a predetermined level.

The filter means may conveniently comprise a fundamental acceptor filter for passing only the fundamental to the first input of the comparator and a separate fundamental rejector filter for passing only the harmonic components to the second input, the outputs from these filters being converted into D.C. signals before application to the first and second inputs of the comparator.

This invention utilises the phenomenon that under certain fault conditions the waveform of the supply signal is distorted. For example, a sinusoidal voltage source causes a sinusoidal current to flow along a normal good conductive path but, should this current pass through a non-linear resistance, e.g. an arc (sparking) path, faulty insulation, dry soil in the earth, etc. or even the human body (since this exhibits a non-linear resistance), then harmonics appear in the waveform and the sinusoidal characteristic is distorted.

Thus, by determining the ratio or percentage of harmonic to fundamental components in the waveform an indication is made of the presence of a fault, and by employing control means responsive to the magnitude of this ratio protective action can be effected at a certain level which is considered to be sufficient to discriminate between a true fault condition and a simulated fault condition caused by the impression of harmonics on the waveform by exterior interference sources. Alternatively, a time delay device may be incorporated in order to render the circuit non-responsive to transient conditions where this is acceptable.

A circuit according to this invention may conveniently be employed in several applications. For example, it could be used as a sensitive ground fault detector where fallen conductors effect intermittent arcing or sparking on the ground, giving rise to a distorted waveform, and this is a particularly useful application since such conductors could conceivably draw insufficient current to operate the normal protective relays. Another application is line fault anticipation since, if an insulator becomes cracked or exteriorly polluted a small amount of current tends to flow to ground and produce a charred path (tracking) whose resistance slowly diminishes until the runaway condition is reached and a "flashover" occurs. During the initial stages of such a fault the current is small in magnitude but has a high harmonic content, thus, a circuit according to this invention could detect such an incipient fault condition.

Domestic and industrial protection can also be effected since a "harmonic" detector according to this invention could be employed to respond to the distorted waveform of current passing through a human body as a result of contact with a faulty tool or domestic appliance, etc. Another application could be in connection with the testing of electric cables or capacitors, or the detection of faults therein, since structural weaknesses in such members are frequently manifested as small voids in the insulation, and electrical discharges across these voids are rich in harmonics, due to corona or arcing, which can thus readily be detected.

Yet another application for a circuit according to this invention is in effecting discrimination between a fault and an overload. In this connection, on many high voltage systems there are sometimes conditions of minimum generation during which the fault current is less than the load current and in such cases advantage can be taken of the fact that (a) even solid faults start off with an arc until steady contact has been established, and (b) in large networks there is an initial high frequency oscillation due to the release of the charge on the system capacitance. Both of these phenomena provide an initial burst of harmonics which could readily be used to operate this circuit.

These various applications are merely referred to by way of example, and many other uses may readily be conceived for a circuit according to this invention in connection with fault detection.

In order that the invention may be fully understood, one embodiment thereof will now be described, by way of example, with reference to the accompanying drawings, in which.

Figure 1:
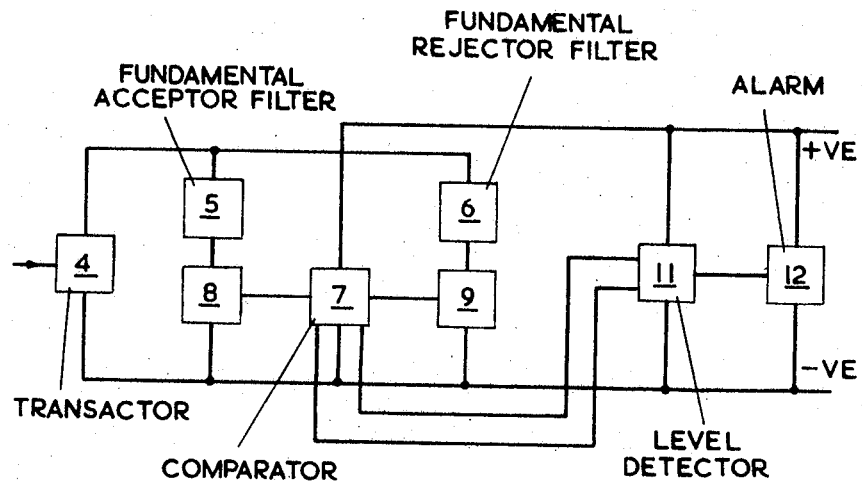
FIG. 1 illustrates a block diagram of a circuit according to this invention.

Referring now to FIG. 1, a circuit according to this invention comprises a transactor 4 to which the input signal is applied. The output from this transactor is applied to both a fundamental frequency acceptor filter 5 and a fundamental rejector filter 6, and the outputs from the two filters, that is, the fundamental from filter 5 and the harmonic components from filter 6, are applied to a comparator 7 through transformer-rectifier units 8 and 9, respectively. In turn, the output from the comparator is applied to a level detector 11 operable to actuate a protective circuit 12 upon the output attaining a pre-determined level.

Figure 2:
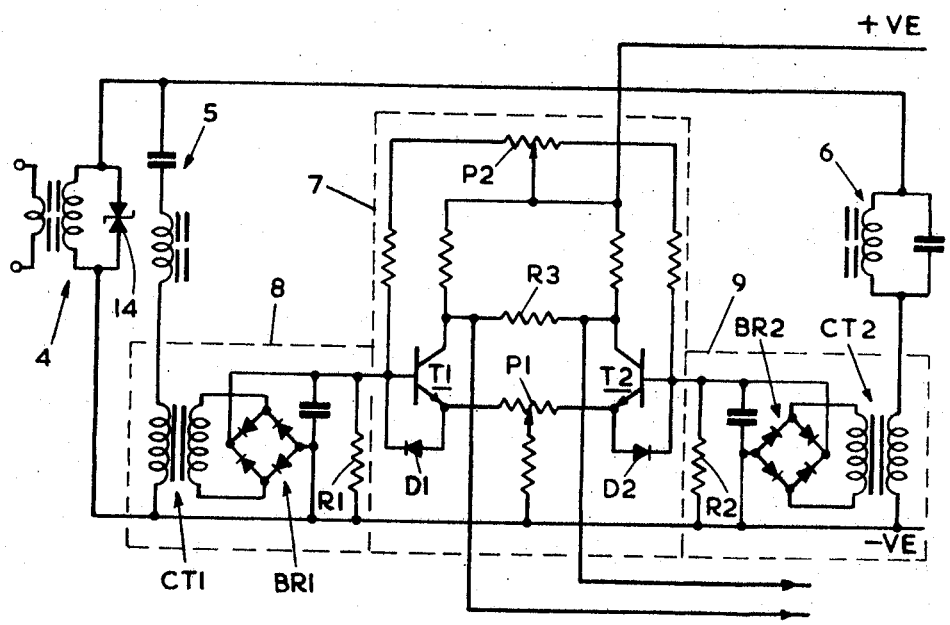
FIG. 2 illustrates a detailed circuit diagram of part of the circuit shown in FIG. 1.

The input circuitry is shown more particularly in FIG. 2 from which it can be seen that the secondary winding of the transactor 4 has connected across it a thyrector 14 for limiting the output voltage developed across this winding, this voltage being proportional to frequency and thus accentuating the higher harmonic components. The acceptor filter 5 comprises a series LC circuit tuned to the fundamental and this fundamental component is developed across the primary winding of a current transformer CT1. The secondary winding of this transformer is connected across the A.C. terminals of a bridge rectifier BR1, a smoothed D.C. output being developed across resistor R1 constituting one input to the comparator.

The rejector filter 6 comprises a parallel LC circuit tuned to the fundamental so that in this case only the harmonic components are developed across the primary winding of a current transformer CT2. The secondary winding of this transformer is connected across the A.C. terminals of a bridge rectifier BR2 and, just as in the case concerning the fundamental, a smoothed D.C. output is developed across resistor R2 constituting the other input to the comparator.

The comparator 7 comprises two transistor amplifiers T1 and T2 which are arranged in a balanced configuration, a resistor R3 being connected between their collector electrodes. Limiting diodes D1 and D2 are connected across the base-emitter junctions of transistors T1 and T2 in order to protect them from damage by excessive input signals and potentiometers P1 and P2 are adjustable to set the output to zero with the input terminals open- and short-circuited, respectively.

The resultant output from the comparator is developed across the resistor R3 and applied, as mentioned above, to the level detector 11 for operating the protective circuit 12.

Figure 3:
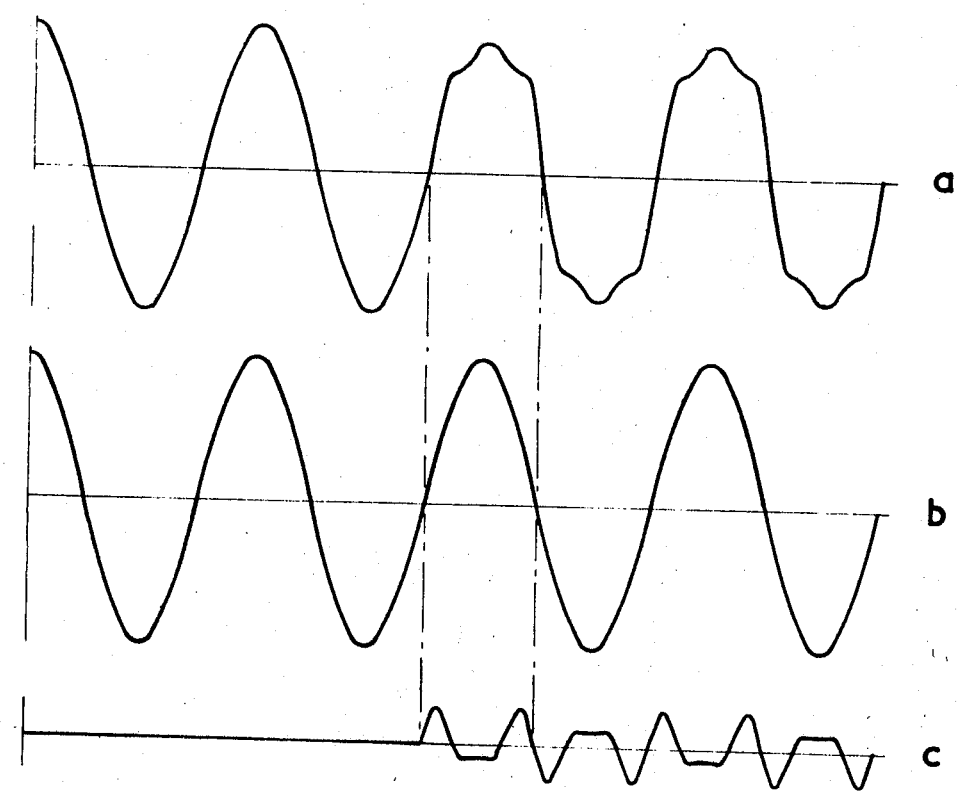
FIGS. 3(a) to 3(c) show waveforms appearing at various positions in the above circuit.

A typical waveform which might be applied to this circuit is shown in FIG. 3(a), the waveform initially being sinusoidal and then being distorted due to the presence of third and fifth harmonics, this distortion resulting from a fault condition.

FIG. 3(b) shows the fundamental component developed across the primary winding of CT1 and FIG. 3(c) shows the summation of the third and fifth harmonics developed across the primary winding of CT2.

The D.C. voltage appearing across R1 will thus be dependent on the limiting excursions of the fundamental component (FIG. 3(b)) and the D.C. voltage appearing across R2 will be dependent on the limiting excursions of the harmonic components (FIG. 3(c)). In this instance both transistors will be conductive but, assuming T1 and T2 to be a matched pair, the voltage dropped across the collector resistor of transistor T1 will be greater than that dropped across the collector resistor of transistor T2 so that there will be a potential difference developed across R3 indicative of the ratio of the signal voltages across R1 and R2, i.e. indicative of the ratio of harmonics to the fundamental. This potential difference is greatest when only transistor T1 is conductive, i.e. when only the fundamental frequency is present and diminishes towards zero when both transistors T1 and T2 are conducting, the voltage across R3 decreasing with an increase in the ratio of harmonics to fundamental. Thus, by adjusting the level detector 11 to give an output when the potential difference across R3 reduces to a certain level, an alarm or control function may be effected by the circuit 12 upon the ratio of the harmonics to the fundamental attaining or exceeding a pre-determined value.

The current transformation ratios of CT1 and CT2 could alternatively be arranged so that the potential difference across R3 drops to a particular convenient value, e.g. zero or a "negative" level, upon the ratio of harmonics to fundamental attaining the predetermined value, or of course the transistor circuitry could be adjusted to effect this. In particular, the circuit may be set to effect its protective function when the harmonic components exceed 5% of the fundamental.

In some applications it may be desirable to introduce a time delay before actuating the protective circuit 12 and this may conveniently be effected by introducing a delay circuit between the level detector 11 and this protective circuit 12.

Although this invention has been described with reference to a current input, a voltage input can alternatively be employed in which case the transactor 4 may be replaced by a voltage transformer. The choice of a current or voltage input depends upon the ratio of the magnitudes of the linear and non-linear impedances in the protected circuit. More particularly, assuming a sinusoidal, the current will be non-sinusoidal only if the circuit impedance is mostly non-linear, e.g. as in the case of a high resistance ground fault. If, on the other hand, it is mostly linear, e.g. as in a direct flashover, the current will be sinusoidal but the voltage will be non-sinusoidal near the fault.

I claim:
1. A circuit for detecting such electrical faults as distort a supply waveform, comprising
 a comparator having first and second input terminals,
 a pair of transistor amplifiers having input circuits separately connected to the two terminals, and output circuits,
 filter means comprising
  a fundamental acceptor filter connected to the supply and adapted to pass to the said first input only the fundamental component, and
  a fundamental rejector filter for passing to the said second input only the harmonic components,
 circuit means interconnecting the output circuits of the transistor amplifiers, said circuit means including
 balance networks for balancing the pair of transistor amplifiers, and
 differential means for developing a difference signal output having a value dependent on the relative magnitude of the said fundamental and harmonic components applied to the first and second inputs, and
 a control device for effecting a control function in response to the value of said output attaining a predetermined level.

References Cited

UNITED STATES PATENTS 2,863,100 12/1958 Rice _____ 317—27
3,048,744 8/1962 Warrington _____ 317—27

JAMES D. TRAMMELL, Primary Examiner

U.S. Cl. X.R.

317—33, 53; 340—253